Patented Sept. 4, 1951

2,566,549

UNITED STATES PATENT OFFICE 2,566,549

ANIMAL FEEDSTUFF

Gertrude H. Beckwith and James L. Sutherland, San Pedro, Calif., assignors to Philip R. Park, Inc., Outer Harbor, San Pedro, Calif., a corporation of California No Drawing. Application July 9, 1949, Serial No. 103,942

34 Claims. (Cl. 99—2)

This invention relates to feedstuffs, and more particularly to concentrated animal feeding materials derived especially from fish and also from other sources supplying proteinaceous substances in concentrated form.

An important object of this invention is to produce, without application of heat, a dry, proteinaceous feedstuff from proteinaceous concentrates which are conveniently producible commercially only in a very wet condition as a semi-solid or slurry, such as the so-called "fish solubles" and "fish glandular hydrolysates" derived as by-products of the fish industry and herein designated as "condensed fish concentrates" or "fish-soluble concentrates."

The fish industry now supplies by-product concentrates which were formerly wasted by discarding the press liquor or "stick" resulting from the pressing of various types of fish in the preparation of fish meal for feeding and other purposes. Formerly, the disposition of this waste press liquor constituted a serious problem because of nauseating odors developing from fermentation, and because of water pollution from discharge into streams, bays, and harbors. More recently it has been found that these fish press liquors actually contain large proportions of valuable food ingredients including coagulable proteins, noncoagulable proteins in solution or suspension therein, dissolved mineral salts, and various vitamins. By coagulating the coagulable proteins and concentrating the liquors, with or without removing the coagulated proteins, it has been found that a very valuable feedstuff is obtained. Ordinarily, the coagulated material is not removed and the concentrated product is a semi-solid or slurry which contains in the order of 50% of water, but it may contain considerably less water, such as 25% water, or appreciably more. It is one of the materials commonly known and referred to hereinafter as "fish solubles" or "fish-soluble concentrate," or "condensed fish solubles." Similar materials to be included within the general term "fish concentrates" for the purpose of this specification are fish liver concentrates and the like, and those known as "fish glandular hydrolysates." The latter are glandular fish extracts which have been digested by enzymatic digestion, that is, with proteolytic enzymes, to preserve their amino acid content, although fish protein hydrolysates which have been digested with acid (such as hydrochloric acid) are within the scope of the present invention, although they are not so desirable because of the effect of the digesting acid upon the amino acids. These extracts and the described fish solubles are those included in the term "condensed fish concentrates," as previously indicated.

As has been above indicated, when "fish solubles" or "fish-soluble concentrates" are obtained in their usual concentrated form, they contain considerable water. One object of this invention is to prepare a feedstuff from such fish protein concentrates having high water content so that the product shall be dry and may be readily handled, and also that such dry product may, if desired, be mixed with other dry proteinaceous solid materials such as fish meal, animal meal (often referred to as "meat scraps"), vegetable protein meals such as soy bean meal, and the like.

It is a further object of the invention to prepare the above-mentioned water-containing fish concentrates with agents which not only serve to yield a dry product but which, at the same time, serve to supply a valuable dietary constituent. Such agents are represented notably by hydratable phosphates capable of taking up several molecules of water as water of crystallization.

In practicing the present invention, any of the above-described fish concentrates in wet form obtained from press liquor or other source by any usual or preferred concentrating method, are combined in some appropriate manner with a quantity of edible phosphates capable of taking up as water of crystallization that proportion of the water of the concentrate necessary to yield a sufficiently dry product. For example, a product may be considered sufficiently dry when it contains only 10% or 12% of moisture, but more moisture, for example 15%, or less moisture, for example 5%, may be in order for different purposes, or for different conditions of storage. Thus, a wet fish-soluble concentrate containing both dissolved and undissolved solids such as salts, vitamins, coagulated proteins, and uncoagulated proteins, in the presence of 40% to 60% of water, for example, will have added thereto, or supplied thereto in any other appropriate manner, an edible phosphate salt which will combine with a required proportion of the water to yield hydrated phosphates containing such desired proportion of water as water of crystallization. Two particularly desirable, edible phosphates are disodium phosphate ($Na_2HPO_4$) and calcium ammonium phosphate, which exists as a heptahydrate.

($CaNH_4PO_4 \cdot 7H_2O$)

In view of its nature, the calcium ammonium phosphate is formed in situ as presently to be described. In employing the disodium phosphate, it may be added to the semisolid or slurry type of concentrated fish solubles, above described, in a completely anhydrous form or in the largely anhydrous form containing two molecules of water (Na₂HPO₄.2H₂O). These anhydrous and partially hydrated forms take up water of crystallization to yield the heptahydrate (Na₂HPO₄.7H₂O)

As a consequence, the anhydrous form takes up 7 molecules of water and the dihydrate takes up 5 molecules of water. It is preferred to employ the anhydrous form because of its greater water-combining property, each pound of such anhydrous form being capable of binding 0.89 pound of water to form the heptahydrate. While disodium phosphate will bind 12 molecules of water as water of crystallization at lower temperatures, it nevertheless loses 5 molecules of water at temperatures a little above normal (about 85° F. to 105° F.) which would be objectionable under some storage conditions. However, the heptahydrate is desirable because it is then stable up to around 115° F. to 120° F.

From the standpoint of the use of the calcium ammonium phosphate, the hydrated dicalcium phosphate (CaHPO₄.2H₂O) is required either as a starting material or as an intermediate material. Either this dicalcium phosphate may itself be added to the wet mixture or wet concentrate herein described, or formed in the wet mixture or otherwise from tricalcium phosphate, monocalcium phosphate, calcium pyrophosphate, calcium carbonate and phosphoric acid or phosphoric anhydride, or calcium oxide and phosphoric acid or phosphoric anhydride, as will be apparent to the skilled chemist. Upon supplying dicalcium phosphate with ammonia in the wet mixture or slurry, either by addition thereto or formation therein of the dicalcium phosphate, the previously mentioned heptahydrate of calcium ammonium phosphate forms in accordance with the following formula:

CaHPO₄.2H₂O+NH₃+5H₂O=CaNH₄PO₄.7H₂O

As is made evident by the above equation, the formation of the calcium ammonium phosphate results in the taking up of 5 molecules of water as water of crystallization.

From the standpoint of the calcium ammonium phosphate, some of the ammonia often will be supplied by the fish solubles which have an ammonia constituent (e. g. ammonium sulfate) in amounts varying up to about 1%. When the ammonia content of the fish solubles is too low, ammonia will be added as required, and this applies also to the fish granular hydrolysates previously mentioned. When one pound of dicalcium phosphate is converted to calcium ammonium phosphate, 0.52 pound of water is taken up as water of crystallization in the form of the calcium ammonium phosphate heptahydrate. Thus, assuming no addition of ammonia and the treatment of concentrates containing 50% water, one pound of dicalcium phosphate will take up all of the water from 1.04 pounds of the concentrate, or, in other words, about 49% of the product represents dicalcium phosphate and 51% of the product represents the original fish solubles and their water content, the water content being now combined in the hydrated calcium ammonium phosphate, such water content being about 25.5% of the dry product, of which the fish constituents, on a water-free basis, constitute about 25.5% of the dry product.

From the standpoint of the production of dicalcium phosphate, or equivalent, in the wet fish concentrate represented either by fish solubles or fish glandular hydrolysates, the following equations are indicative of the method of procedure where calcium carbonate and phosphoric acid are used:

CaCO₃+H₃PO₄+H₂O+5H₂O+NH₃=
CaHPO₄.2H₂O+CO₂+5H₂O+NH₃=
CaNH₄PO₄.7H₂O+CO₂

On a theoretical basis, 100 pounds of fish concentrate containing 50% water, in order to take up all of the water as water of crystallization, will require about 46 pounds of calcium carbonate, about 45 pounds of phosphoric acid, and about 8 pounds of ammonia for the reaction to go to completion. This amount of ammonia ordinarily is more than that naturally found in the concentrate. Therefore, some ammonia usually must be added. In the resultant product, about 42% is the calcium ammonium phosphate, figured without its water content, about half of the remaining 58%, i. e. about 29%, being the water of crystallization of the heptahydrate, and the other 29% being the dry fish constituent.

While the above figures indicate the use of phosphate in quantities sufficient to take up all of the water of the fish concentrate, it will be appreciated that absolute dryness ordinarily will not be required, and that from 5% to perhaps 15% or 20% of free moisture content, for example 10%, will ordinarily be preferable.

It is to be appreciated that all percentages are on a weight basis.

Since the initial mixture of the fish concentrate, represented by either of the previously mentioned fish solubles or fish glandular hydrolysates, is a rather sloppy slurry following addition of the edible phosphate salt, a rather long standing period or "curing" time, such as two or three days, is required unless some step is taken to accelerate the hydration process.

The curing time for the hydration stage may be desirably accelerated, and a more uniform product obtained, by adding an edible wetting agent, of which there are many. One such wetting agent is a sulfonated fish oil; again, any sulfonated edible liquid animal or vegetable oil may be used. Of course, these wetting agents must be stable under the acidic conditions normally existing in the fish concentrates, for example pH 4.5 to pH 5.5, or within the range of pH 4 to pH 6. About ½₀% to ¼% of such a wetting agent is employed, and an optimum percentage is in the order of ₁⁄₁₀%. This reduces the curing time to about one-half or two-thirds the time otherwise required, and it results in uniform combining of the water of crystallization throughout the mass after hydration has been completed. The resultant hard mass or cake is ordinarily ground to produce a meal of appropriate fineness.

It may also be desirable to add some agent to the prepared meal which will prevent subsequent lumping. Any material capable of performing such a function may be employed, and calcium stearate is an example of appropriate substances. It will ordinarily be used to the extent of about ½% by weight, and 1% may be considered an upper limit. Also, as little as ¼% is quite effective. Other anti-lumping agents which might be used are other water-insoluble salts of saponifiable fatty acids, such as the calcium soaps thereof, these including oleates for example, and such soaps of other appropriate metals, such as magnesium, which soaps, however, are to be used in proportions too small to be objectionably toxic or cathartic. The calcium soaps constitute a preferred group of soaps because they are water-insoluble and because in all proportions required they are free from objectionable features such as toxic or cathartic characteristics.

It is often desirable to incorporate other proteinaceous meals with the prepared, dry product above described as produced from wet fish solubles and glandular hydrolysate concentrates and the like with edible phosphate salt capable of binding several molecules of water, also as above described. Such other proteinaceous meals may be the common fish meals, such as the pressed fish meals above mentioned from which the press liquor was originally derived, proteinaceous vegetable meals such as soy bean meal, animal meals of the type commonly known on the market as meat scraps and the like. Such meals as commonly produced are adequately dry and do not in themselves require a drying treatment, their moisture content being usually in the order of about 7%, 10%, or 12%. In fact, if desired, they might be employed to take up some of the moisture initially found in the fish concentrate previously described. Such drying effect might be accomplished by adding fish meal, soy bean meal, or meat scraps, or any desired mixture thereof, to the wet fish concentrate undergoing treatment, or such additional meal can be added after the treatment with the phosphate salt has been completed. It will be apparent that, if an end product containing about 15% to 20% moisture is required and the added proteinaceous meal contains only about 10%, this proteinaceous meal may be relied upon to absorb an appreciable portion of water initially found in the fish concentrate. For example, 40 pounds of the fish concentrate containing 50% water has been satisfactorily combined with 50 pounds of soy bean meal containing 10% moisture, and 10 pounds anhydrous disodium phosphate to yield a product containing about 16% of free moisture and about 9% of hydrate moisture combined with the disodium phosphate as the heptahydrate of the disodium phosphate. Again, 25 pounds of described fish concentrate containing 50% moisture have been combined with fish meal containing 7% moisture and 5 pounds of anhydrous disodium phosphate to yield a product containing about 13% free moisture with about 4.5% of water combined as heptahydrate of the disodium phosphate. Another suitable product here presented as an example is obtained by combining 40 pounds of mixed fish solubles and fish glandular hydrolysates containing 50% water with soy bean meal containing 10% of moisture and 15 pounds of dicalcium phosphate, thereby yielding a product containing about 14% free moisture and approximately 8% of hydrate moisture in the form of the previously described heptahydrate of calcium ammonium phosphate. Where greater free moisture contents are permissible, smaller proportions of the edible phosphate salt are used, and where smaller proportions of free moisture are required, greater proportions of the phosphate salt are used, to the point where no free moisture remains, all the water having been taken up in the hydrate itself. Ordinarily, use of the hydrated salt to the extent of complete elimination of free moisture is carried on only in connection with treatment of wet fish concentrates, such as the fish solubles and the fish glandular hydrolysates described, such moisture-free products being usually employed in admixture with one or more of the other proteinaceous meals mentioned. Other usable proteinaceous meals than those indicated include sesame seed meal, cotton seed meal, sunflower seed meal, peanut meal, and copra meal.

Removal of water by the means above described and also the employment of the described phosphates serve to retard molding of the feed product. This results, of course, both because the drying of the product by taking up the excess water as water of crystallization serves to retard molding, and also because the phosphates raise the pH of the product to about 6.5 which pH is unfavorable for molding and in itself normally prevents molding of the dry product of this invention.

Some particular formulas which have been employed in preparing feedstuffs in accordance with this invention are:

| | Pounds |
|---|---|
| (1) Soy bean meal | 1,000 |
| Fish-soluble concentrates (50% water) | 800 |
| Disodium phosphate (anhydrous) | 200 |
| Total | 2,000 |

To the above, 10 pounds of calcium stearate may be added to prevent lumping, the calcium stearate being thoroughly distributed.

| | Pounds |
|---|---|
| (2) Fish meal | 1,425 |
| Fish solubles and fish glandular hydrolysates (50% water) | 500 |
| Disodium phosphate | 75 |
| Total | 2,000 |

To mixes of the above, 10 pounds per ton and also 8 pounds per ton of calcium stearate have been used to prevent lumping.

| | Pounds |
|---|---|
| (3) Fish solubles and fish glandular hydrolysates (50% water) | 1,340 |
| Disodium phosphate | 660 |
| Total | 2,000 |

Calcium stearate in amounts of 8 pounds to 10 pounds per ton, well distributed, has prevented lumping.

| | Pounds |
|---|---|
| (4) Soy bean meal (10% water) | 900 |
| Fish solubles and fish glandular hydrolysates (50% water) | 800 |
| Dicalcium phosphate | 300 |
| Total | 2,000 |

The above satisfactory product contained about 14% free moisture and about 8% water of hydration.

| | Pounds |
|---|---|
| (5) Fish meal (7% water) | 1,300 |
| Fish soluble concentrates (50% water) | 500 |
| Dicalcium phosphate | 200 |
| Total | 2,000 |

This product contained about 12% moisture and about 5% water of hydration.

| | Pounds |
|---|---|
| (6) Fish solubles and fish glandular hydrolysates (50% water) | 1,200 |
| Dicalcium phosphate | 800 |
| Total | 2,000 |

This product contained about 9% free moisture and about 21% water of hydration. Calcium stearate in amounts of about 8 pounds to 10 pounds per ton satisfactorily prevents lumping in products of Examples 4, 5, and 6.

In preparing Formulas (1), (2), (4), and (5) without addition of wetting agents, about 60 hours to 72 hours have been required to complete hydration of the phosphate salt. In preparing Formulas (3) and (6) the time has been more variable, depending upon the physical characteristics of the concentrate, and time has run from about 24 hours to 96 hours. Where a wetting agent has been employed to the extent of about 0.1% to 0.2%, the time necessary to complete hydration has dropped in comparable cases from about 60 hours to about 40 hours, and in about the same proportion in other instances. Various wetting agents have yielded approximately the same results. Other appropriate wetting agents which are stable under existent acid conditions as above indicated include: sulphonated fish oils and sulphonated vegetable oils, polyoxyethylene sorbitol fatty acid esters (such as the "Tweens" of Atlas Powder Company) and polyoxyethylene glycol fatty acid esters, which are examples of edible wetting agents that may be used. Alkyl sulfates, sulfated esters and sulphonated aromatics would be satisfactory when the proportions are too small to be toxic.

By way of further definition of various terms used above and in the claims, the concentrated fish solubles are also known as "condensed fish solubles," and the fish glandular hydrolysates are referred to also as "condensed fish glandular hydrolysates," both having been included in the term "condensed fish concentrates." The term "fish concentrates" is intended to include not only the condensed fish solubles and the condensed fish glandular hydrolysates, but also other wet fish concentrates such as fish liver concentrates, and kindred semi-solid fish products. From the standpoint of highly liquid or slurry type of condensed fish solubles and condensed fish glandular hydrolysates, these are both intended to be included also within the term "fish soluble concentrates" which would include similar liquid products of similar high fish protein content, including any form of fish protein hydrolysates in addition to the fish glandular hydrolysates.

Inasmuch as variations of the generic invention herein disclosed will become apparent to those skilled in this art, it is intended to protect all such modifications as fall within the scope of the patent claims.

We claim as our invention:

1. In a dry feedstuff: a fish concentrate product initially containing fish solids in soluble and insoluble form in a substantial amount of water forming a semisolid; and an edible phosphate salt initially capable of combining with several molecules of water and present in such feedstuff in proportion holding said water as water of crystallization in sufficient proportion to yield a dry feed product.

2. In a dry feed stuff: an edible hydrated phosphate salt holding several molecules of water of crystallization; and a fish concentrate containing soluble and insoluble forms of fish solids, water being present in amount normally forming a wet semisolid of said soluble and insoluble fish solids, and said salt being present in proportion holding such water as said water of crystallization to an extent yielding a dry concentrate product constituting said feed stuff, said salt being hydrated disodium phosphate.

3. A method for producing a feedstuff comprising: preparing a fish product containing fish solids in both soluble and insoluble form in water yielding a slurry; and supplying therein a quantity of edible phosphate salt capable of combining with several molecules of water, and employed in proportion to yield a substantially dry product.

4. A method according to claim 3 including the additional step of allowing the slurry containing the phosphate salt to cure for a time whereby the phosphate salt takes up the water as water of crystallization and yields a dry product.

5. A method as in claim 4 including the incorporation in the salt-containing slurry of an edible wetting agent amounting to less than about one per cent of the total and sufficient to reduce substantially the time for the salt to take up the water.

6. A method for producing a feed stuff including preparing a fish product containing fish solids in both soluble and insoluble forms in water yielding a slurry; and supplying therein a quantity of edible phosphate salt which combines with several molecules of said water and is employed in proportion to yield a substantially dry feed stuff product, said salt being disodium phosphate.

7. A method as in claim 3 wherein dicalcium phosphate is incorporated in the slurry in the presence of ammonia to yield hydrated calcium ammonium phosphate.

8. A method for producing a feedstuff, comprising the steps of: preparing an aqueous fish product from fish press liquor, such aqueous product containing fish constituents in both soluble and insoluble form and having a wet, semisolid consistency; combining with said aqueous product proteinaceous meal of lesser water content than the water content of said aqueous fish product and thereby partially drying said fish product; supplying in said product an edible phosphate salt capable of combining with several molecules of water of said product and in proportion to yield a dry feedstuff; and curing the resultant mixture to effect hydration of said edible salt and thereby render the resultant feedstuff dry.

9. A method for producing a feed stuff including the steps of: preparing an aqueous fish product from fish press liquor, such aqueous product containing fish constituents in both soluble and insoluble forms and having a wet semi-solid consistency; combining with said aqueous product a proteinaceous meal of lesser water content than the water content of said aqueous fish product and thereby partially drying said fish product; supplying in said product an edible phosphate salt which combines with several molecules of water of said product, said salt being generally anhydrous disodium phosphate supplied in proportion to yield a dry feed stuff; and curing the resultant mixture to effect hydration of said salt and thereby render the feed stuff dry.

10. A method as in claim 28 wherein the salt selected is calcium ammonium phosphate.

11. A method as in claim 8 including incorporating an edible wetting agent for the fish constituents in amount to reduce materially the time for the salt to become fully hydrated.

12. A dry animal feedstuff comprising: a protein concentrate; and an edible phosphate salt containing several molecules of water as water of crystallization and thereby yielding a dry feedstuff by reason of transition of water of said concentrate to said water of crystallization.

13. A feedstuff as in claim 12 wherein said concentrate comprises fish concentrates including "fish solubles" and fish meal.

14. A feedstuff as in claim 12 wherein said concentrate includes fish concentrates and vegetable protein concentrates.

15. A feedstuff as in claim 12 wherein said concentrate includes fish concentrates and animal protein concentrates.

16. A dry feedstuff comprising: a fish concentrate; and an edible phosphate salt holding several molecules of water of crystallization and rendering said concentrate dry.

17. In a dry feed stuff: a fish concentrate; and an edible hydrated phosphate salt holding several molecules of water of crystallization and rendering said concentrate dry, said salt being hydrated disodium phosphate.

18. A feedstuff as in claim 16 wherein said fish concentrate includes condensed "fish solubles."

19. A dry feedstuff as in claim 16 wherein said fish concentrate includes fish glandular hydrolysates.

20. A dry feedstuff as in claim 16 wherein said fish concentrate includes a protein meal as an additional ingredient.

21. A dry feedstuff as in claim 16 wherein said fish concentrate includes approximately one-half per cent of an edible anti-lumping agent.

22. A dry feedstuff as in claim 16 wherein said fish concentrate includes a wetting agent for the fish solubles of said concentrate.

23. In a dry feed stuff: a fish concentrate product containing fish solids in soluble and insoluble forms present with a substantial amount of combined water normally forming a semi-solid; and an edible phosphate salt selected from the class consisting of disodium phosphate and calcium ammonium phosphate hydrated with several molecules of said water and present in such feed stuff in proportion holding said water as water of crystallization to an extent to yield a dry product constituting said dry feed stuff.

24. A feed stuff as in claim 23 wherein said salt is hydrated calcium ammonium phosphate.

25. A method for producing a feed stuff including: preparing a fish product containing fish solids in both soluble and insoluble forms in water yielding a slurry; and supplying therein a quantity of a generally anhydrous edible phosphate salt from a class consisting of disodium phosphate and calcium ammonium phosphate, which salt combines with several molecules of said water and is employed in proportion to yield a substantially dry product.

26. A method as in claim 25 including the step of allowing the slurry containing the phosphate salt to cure for a time adequate for the phosphate salt to take up the water as water of crystallization and yield the dry product.

27. A method as in claim 25 wherein said salt is calcium ammonium phosphate.

28. A method for producing a feed stuff including the steps of: preparing an aqueous fish product, such aqueous product containing fish constituents in both soluble and insoluble forms and having a wet, semi-solid consistency; combining with said aqueous product a proteinaceous meal of smaller water content than the water content of said aqueous fish product and thereby partially drying said fish product; supplying in said aqueous product an edible phosphate salt selected from the class consisting of generally anhydrous disodium phosphate and calcium ammonium phosphate, such salt combining with several molecules of water of said aqueous product and being supplied in proportion to yield a dry feed stuff; and curing the resultant mixture to effect hydration of said salt and thereby yield a dry feed stuff product.

29. A method as in claim 28 including the step of incorporating an edible wetting agent for the fish constituents in proportion to reduce materially the time for said salt to become fully hydrated.

30. A dry animal feed stuff including: a protein concentrate; and an edible phosphate salt selected from the class consisting of hydrated disodium phosphate and calcium ammonium phosphate, said salt containing several molecules of water of crystallization drawn from said concentrate and rendering said concentrate dry to yield said dry feed stuff.

31. A feed stuff as in claim 30 wherein said salt is the heptahydrate of disodium phosphate.

32. A feed stuff as in claim 30 wherein the salt is the heptahydrate of calcium ammonium phosphate.

33. A dry feed stuff including: a fish concentrate; and an edible hydrated phosphate salt holding several molecules of water of crystallization and rendering said concentrate dry, said salt being selected from the class consisting of hydrated disodium phosphate and calcium ammonium phosphate.

34. A dry feed stuff as in claim 33 wherein said salt is calcium ammonium phosphate.

GERTRUDE H. BECKWITH.
JAMES L. SUTHERLAND.

REFERENCES CITED

The following references are of record in the file of this patent:

UNITED STATES PATENTS

| Number | Name | Date |
| --- | --- | --- |
| Re. 22,500 | Shoeld | June 20, 1944 |
| 2,371,812 | Ernst | Mar. 20, 1945 |
| 2,403,174 | Ernst | July 2, 1946 |
| 2,427,520 | Briod | Sept. 16, 1947 |
| 2,442,969 | Butt | June 8, 1948 |